J. C. HEINTZ AND G. RUF.
VULCANIZER.
APPLICATION FILED MAR. 18, 1920.
Reissued July 13, 1920. 14,913.
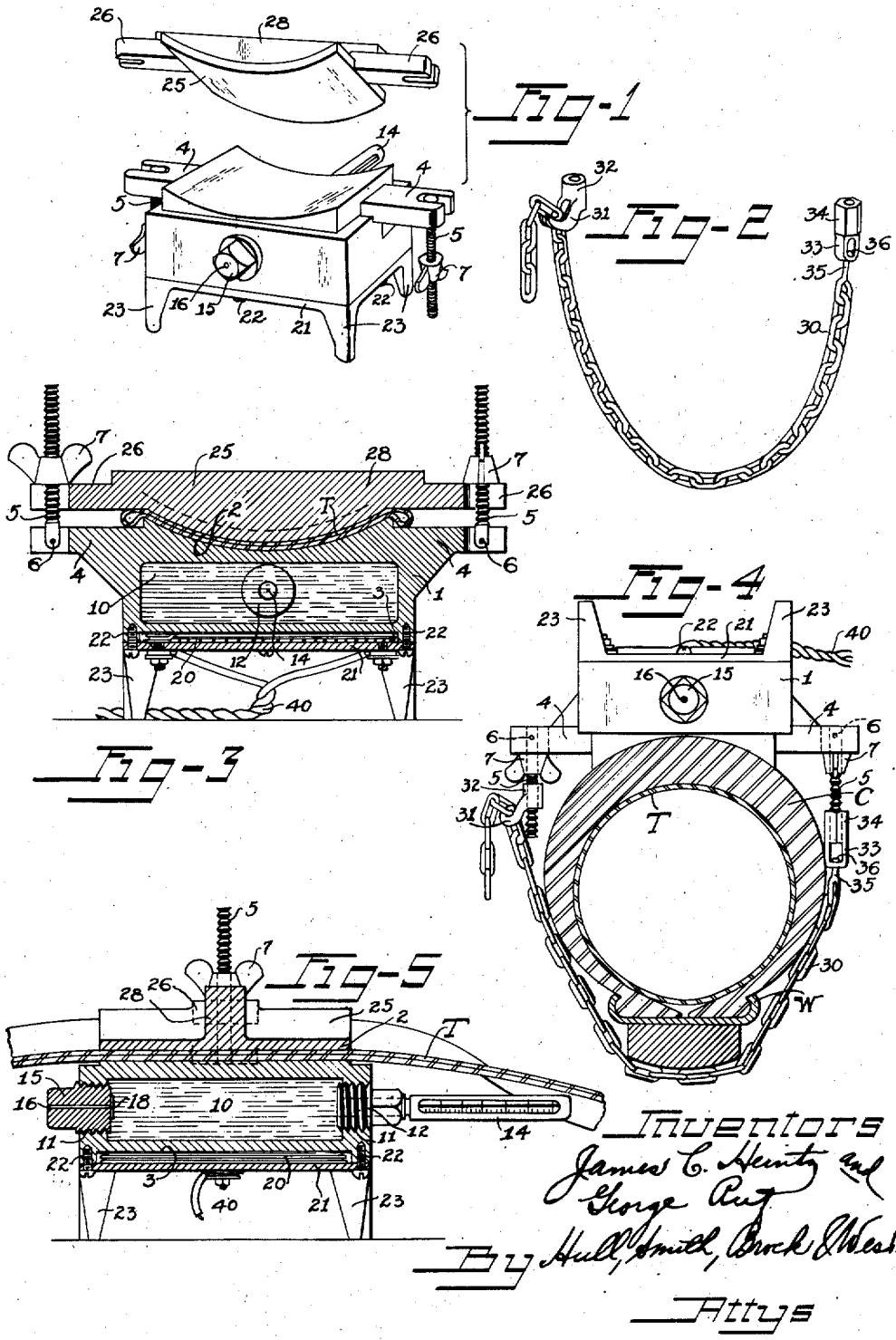

UNITED STATES PATENT OFFICE.

AMES C. HEINTZ AND GEORGE RUF, OF CLEVELAND, OHIO; SAID RUF ASSIGNOR TO SAID HEINTZ.

VULCANIZER.

14,913. Specification of Reissued Letters Patent. Reissued July 13, 1920.

Original No. 1,262,598, dated April 9, 1918, Serial No. 95,558, filed May 5, 1916. Application for reissue filed March 18, 1920. Serial No. 366,983.

*To all whom it may concern:*

Be it known that we, JAMES C. HEINTZ and GEORGE RUF, citizens of the United States, each residing at Cleveland, in the county of Cuyahoga and State of Ohio, have invented a certain new and useful Improvement in Vulcanizers, of which the following is a full, clear, and exact description, reference being had to the accompanying drawings.

This invention relates to improvements in vulcanizers, and has for its object to provide a highly efficient vulcanizer that is of simple and substantial construction; extremely convenient of use; that is thoroughly safe and reliable; and that is peculiarly adapted to the mending of either the inner or outer tubes of pneumatic tires.

In more limited terms, the invention may be said to have as its object the production of an electrically heated vulcanizer containing a compartment for fluid (preferably water) whereby the same is prevented from becoming overheated to a degree dangerous to the material upon which it is operating; that may be provided with a thermometer whereby the temperature of the fluid contained in the aforesaid chamber may be ascertained; and an automatically opening vent for the fluid compartment which may consist of a rupturable member or closure for a vent aperture that is fractured when the internal pressure rises above a predetermined point; that is equipped with means for clamping in operative relation to its vulcanizing or working surface, the inner tube of a pneumatic tire (or like object), or whereby the vulcanizer may be secured in operative relation to the outer tube or casing of a pneumatic tire.

The foregoing objects are attained in a vulcanizer constructed in accordance with the accompanying drawing which forms a part hereof and wherein similar reference characters designate corresponding parts throughout the several views of the drawing.

In the drawing, Figure 1 is a perspective view of the vulcanizer with the presser plate removed; Fig. 2 is a similar view of means for attaching the vulcanizer to the outer tube or casing of a pneumatic tire; Fig. 3 is a central vertical section through the vulcanizer showing the inner tube of a pneumatic tire clamped to its vulcanizing or working surface by a clamping plate; Fig. 4 is a transverse section through a pneumatic tire to which the vulcanizer is secured by the means illustrated in Fig. 2; and Fig. 5 is a central section through the vulcanizer at right angles to Fig. 3.

1 represents the body portion of the vulcanizer which consists of and will be referred to hereinafter as a casing, the same being hollow and having a concaved vulcanizing or working surface 2, and a depression or recess 3 in its opposite side. A bifurcated lug 4 extends from each side of the casing, and a screw 5 has its end pivoted within the bifurcation of each lug 4, upon a pin 6 which is supported in the opposed forks of the bifurcated lug. Wing nuts 7 are applied to the screws 5. The chamber 10 of the hollow casing is cored when the casing is cast, and each end of the casing is provided with an aperture 11 through which the core may be removed, and which is threaded for the reception of a threaded plug. A plug 12 is shown as threaded into one of the apertures 11, the plug having a through opening into the outer end of which is inserted the end of a suitable thermometer 14. A plug 15 occupies the aperture 11 at the opposite end of the casing, and a vent opening or port 16 extends through the plug, and the same is adapted to be normally closed by a rupturable member 18, soldered or otherwise secured to the inner end of the plug. The chamber 10 is adapted to permanently contain a suitable fluid, preferably water.

An electric heating element 20 occupies the depression or recess 3 of the casing, and is held therein by a plate 21, secured to the casing by the screws 22. A suitable leg 23 depends from each corner of the plate 21 and serves to support the vulcanizer a suitable distance above a supporting surface, when the same is used for mending such articles as the inner tubes of pneumatic tires.

The vulcanizer is shown in such use in Figs. 3 and 5, and the inner tube T is clamped to the concave vulcanizing or working surface of the casing by a presser plate 25, of a convexed curvature complementary to the concavity of the working surface 2. Laterally extending bifurcated ears 26 of the presser plate line up with the lugs 4 of the casing and are adapted to receive the screws 5, and wing nuts 7 may be screwed down against the outer surfaces of the ears 26 to force the presser plate toward the working surface of the casing. The plate is strengthened transversely by a substantial reinforcing rib 28.

In the repairing of the outer tube or casing C of a tire, the vulcanizer is inverted thereover so that its concaved working surface embraces the damaged portion of the casing, and the same may be secured thereto by the means shown in Figs. 2 and 4 and comprising a chain 30 which may be anchored to one of the screws 5 by means of a fork 31 that is provided with an internally threaded hollow boss 32, that is applied to the screw. The links of the chain may be engaged between the branches of the fork 31 in a well known manner, while the opposite end of the chain may be secured to the other screw 5 by means of a clevis 33 that has an internally threaded wrench or key receiving portion 34 that is adjustable along the last mentioned screw. The connection between the chain and the clevis is made through an eye 35 having its end inserted through the yoke of the clevis and riveted at 36, whereby a swivel connection between the chain and clevis is obtained. From this construction it will be seen that in applying the vulcanizer to a casing, the clevis may be threaded upon the end of the screw 5, the chain swung down beneath the rim W of the wheel and up on the other side and engaged with the fork 31. Thereafter, the parts may be drawn tight by the adjustment of the clevis along its screw.

The vulcanizing process, in general, need not be described, for the same is well known to those skilled in the art; but it may be explained that, in the use of our vulcanizer, a fluid, preferably water, is permanently contained within the chamber 10 and becomes heated when the current is turned into the electric heating element 20 through the wires 40, the heat being transmitted principally through the fluid to the working surface of the vulcanizer. The current is permitted to flow until the temperature of the fluid reaches a predetermined degree (which may be ascertained from the thermometer 14, or judged by the length of time the current is on). Should the vulcanizer become overheated through any cause, such as the carelessness of the operator, the danger of its exploding through the generating of steam within the chamber 10 is obviated by the rupturable member 18 which normally closes the vent port 16 in the plug 15. Upon the internal pressure approaching a dangerous height, the member 18 is fractured and the steam generated in the chamber 10 is permitted to escape.

While we have described, in detail, the embodiment of our invention shown in the drawings, we wish to be understood as not limiting ourselves to the particular details illustrated further than is required by the terms of the following claims as construed in the light of the prior art.

Having thus described our invention, what we claim is:—

1. A vulcanizer comprising a hollow fluid-tight casing having a vent opening and provided with a working surface, the side of the casing opposite said surface having a recess, an electric heating element within said recess, a plate for closing said recess, said plate being provided with legs, means for clamping an object in operative relation to the working surface, and a plug fitted into said vent, said plug being formed with a bore closed on its inner side by a fracturable membrane.

2. A vulcanizer comprising a hollow fluid-tight casing having a vent opening and provided with a working surface, an electric heating element applied to the side of the casing opposite said working surface, means for clamping an object in operative relation to the working surface, and means associated with said vent opening for relieving excessive internal pressure in said casing.

3. A vulcanizer comprising a hollow fluid-tight casing having a vent opening and being provided with a working surface and permanently containing a fluid, an electric heating element applied to the side of the casing opposite said working surface, means for clamping an object in operative relation to the working surface, and means for relieving excessive internal pressure through said vent.

4. A vulcanizer comprising a hollow-fluid-tight casing having a vent opening and being provided with a working surface, the side of said casing opposite the working surface being recessed, a plate for application to the recessed side of the casing, an electric heating element carried by said plate and arranged to repose within the recess, means for clamping an object in operative relation to the working surface of the casing and means normally closing said vent and adapted to open said vent upon excessive internal pressure in said casing.

5. A vulcanizer comprising a hollow fluid-tight casing having two vent openings and provided with a working surface, an electric heating element disposed beneath said working surface, a plug fitted into each of said vent openings, one of said plugs having a bore extending therethrough, said bore being closed by a member fracturable by excessive heat and internal pressure, the other of said plugs being provided with temperature recording means, and means for clamping an object in operative relation to said working surface.

In testimony whereof we hereunto affix our signatures.

JAMES C. HEINTZ.
GEORGE RUF.